Figures 1, 2:
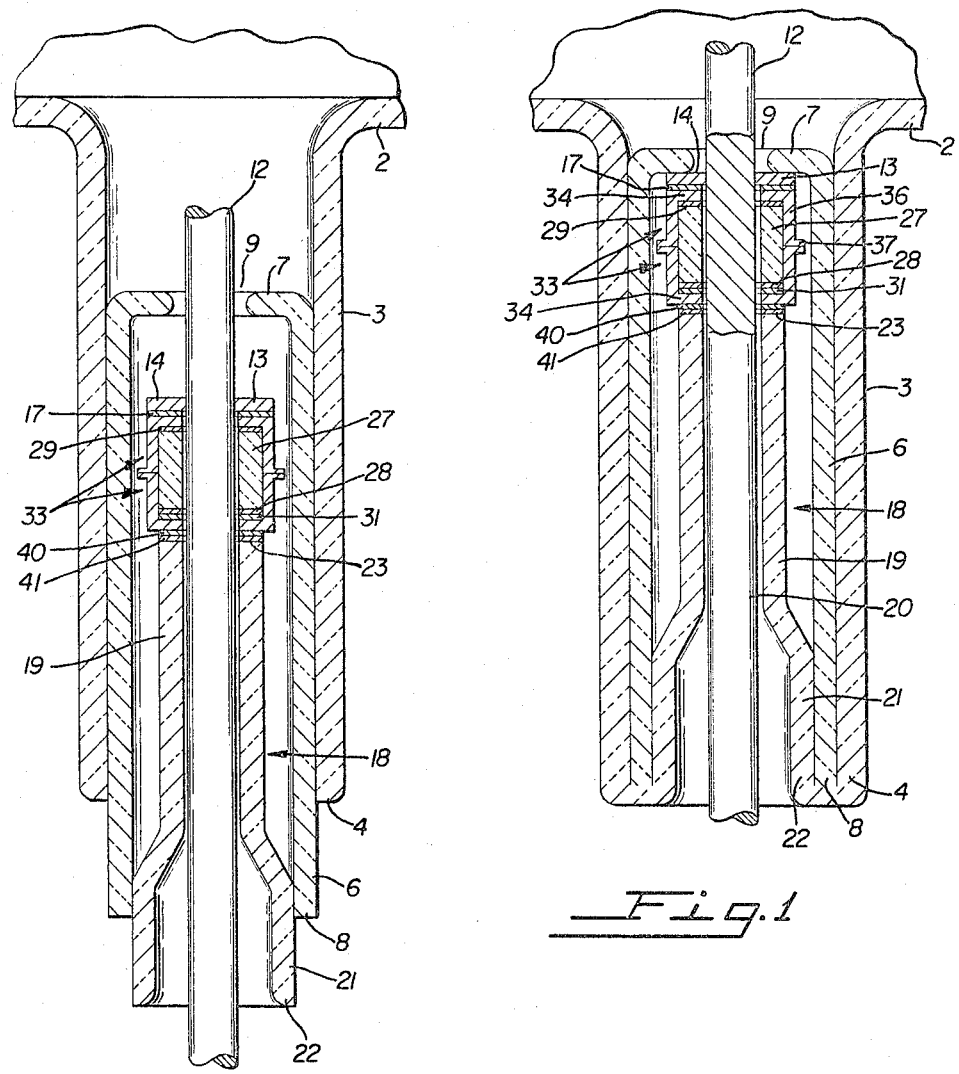

Oct. 25, 1966 G. B. KUEHNE ETAL 3,281,523

HERMETIC SEAL STRUCTURE

Filed July 7, 1964

INVENTORS
GERHARD B. KUEHNE
WERNER P. SCHULZ
OSKAR HEIL
BY
Robert W. Dilts
Leon F. Herbert
ATTORNEYS

United States Patent Office 3,281,523
Patented Oct. 25, 1966

3,281,523
HERMETIC SEAL STRUCTURE
Gerhard B. Kuehne, Santa Clara, Werner P. Schulz, San Bruno, and Oskar Heil, San Mateo, Calif., assignors, by mesne assignments, to Varian Associates, Palo Alto, Calif., a corporation of California
Filed July 7, 1964, Ser. No. 380,855
12 Claims. (Cl. 174—50.61)

This invention relates to hermetic seal structures between metal and dielectric members, and more particularly to such structures wherein a weak flexible sealing ring is required to form the seal and at the same time a mechanically strong joint is required between the metal and dielectric members.

In many devices employed in modern technology, it is necessary to provide a hermetic seal between metal and dielectric members having substantially different coefficients of expansion. For example, in the case of electron tubes having dielectric envelopes, it is necessary to provide a current conducting path through the envelope in the form of a metal lead-through.

In many cases, such as the mentioned examples, it is not only necessary that the seal between the dielectric and metal members be hermetic, but it is also necessary that the members have a very strong mechanical connection. As a practical matter all suitable dielectrics have a lower coefficient of expansion than all suitable metals. As a result, it is not possible to bond the dielectric member directly to a thick strong main metal member because the difference in coefficient of expansion will break the bond. Therefore, the hermetic seal between the metal and dielectric members is often formed by a thin, flexible metal sealing ring having one edge bonded to the metal member and the opposite edge bonded to the dielectric member. The sealing ring is weak enough to deform and thus accommodates the difference in coefficient of expansion between the dielectric and the main metal member and between the dielectric and the sealing ring itself. However, prior designs for this type of seal are lacking in mechanical strength when subjected to forces from a variety of directions.

Accordingly, an object of the present invention is to provide hermetic seal structures having improved mechanical strength.

Another object of the invention is to provide improved hermetic seal structures in which quartz can be employed as the dielectric material. In many cases it is preferable that the dielectric material be quartz (pure silica glass) because of its many desirable characteristics. However, quartz has the lowest coefficient of expansion of all dielectrics and therefore is the most difficult to seal to metal.

A further object of the invention is to provide an improved hermetic lead-through structure.

By way of brief description, a specific embodiment of the improved seal structure comprises a dielectric unit shaped to have two axially spaced flat annular surfaces and a metal unit shaped to have an annular portion which is positioned between said spaced flat surfaces. Said metal unit is rigidly confined between said spaced flat surfaces as regards axial motion but is slideable relative to said spaced flat surfaces as regards radial motion. A flexible sealing ring has one portion bonded to the dielectric unit and a spaced portion bonded to the metal unit. In this way axial and tilting movement of one member relative to the other is fully restrained, and at the same time the critical dielectric-to-metal bond is only between the dielectric and the flexible sealing ring.

Other and further objects and features of advantage will be apparent from the following detailed description wherein reference is made to the accompanying drawings in which:

FIGURE 1 is a vertical cross-sectional view illustrating a lead-through structure according to the invention; and FIGURE 2 is a cross-sectional view similar to FIGURE 1 but partly exploded to show the individual parts more clearly.

For purposes of clarity of description and facility of comprehension of the invention, the lead-through structure is illustrated and described as applied to an evacuated quartz envelope. It will, of course, be understood that many features of the construction herein described and claimed are applicable to any dielectric body and whether or not such body forms a portion of an evacuated envelope.

As applied to a quartz envelope, the invention comprises a fused quartz envelope wall portion 2, provided with a tubular quartz extension 3 initially open at its end 4. While the extension 3 is illustrated as being an integral continuation of the envelope wall portion 2, extension 3 could be a quartz tube open at both ends and having one open end fused into an aperture formed in wall portion 2. Extending into the outer open end of tubular quartz extension 3 is a coaxially arranged tubular quartz sleeve 6 having a radially inwardly extending annular flange 7 on its inner end. In the finished product shown in FIGURE 1, the outer end 8 of sleeve 6 lies substantially flush with the outer end 4 of tubular quartz extension 3, and these ends are fused together. The radially inwardly extending flange 7 on sleeve 6 preferably lies closely adjacent the envelope wall 2 as shown.

As indicated in the drawings, the radially inwardly extending flange 7 is provided with a central aperture 9 through which an electrically conductive metallic lead-through rod or bar 12 extends, preferably in coaxial relationship to the tubular quartz extension 3 and quartz sleeve 6. When employing quartz, the lead-through conductor is preferably fabricated from tungsten. An annular collar 13, preferably of tungsten or molybdenum, is brazed hermetically about the tungsten lead-through rod intermediate its ends. One surface 14 of the annular metallic collar slidably abuts the quartz flange 7 when the rod is inserted through the central aperture of the quartz flange. The side of the collar 13 opposite side 14 thereof is preferably, though not necessarily, provided with a thin layer 17 of gold which may, for example, be deposited thereon by evaporation. The process of evaporating gold to provide a layer thereof on a supporting structure is well known in the art. In the present instance, the main function of the gold layer is to prevent oxidation of the area on the collar covered by gold. This permits assembly of the lead-through conductor and collar, and subsequent storage of these parts for extended intervals without deleterious oxidation. Where the complete assembly of the lead-through conductor with a dielectric body is going to be effected soon after fabrication of the separate parts, the gold layer may be omitted.

Closely surrounding tungsten rod 12 adjacent the end thereof on the atmospheric side of the envelope wall portion is a tubular quartz sleeve 18 having a relatively small diameter portion 19 coaxially arranged about the rod but providing a space 20 thereabout over the entire length of the relatively small diameter portion, and a relatively larger diameter portion 21 which merges smoothly with the small diameter portion 19. The larger diameter portion of the sleeve 18 lies snugly within the sleeve 6 and is provided with an open end 22 which in its finally assembled position lies flush with ends 4 and 8 of members 3 and 6, respectively, and is fused thereto.

The inner end surface 23 of sleeve 18 lies axially spaced a short distance from the radially inwardly extending dielectric flange 7, and from the radially outwardly extending metallic collar 13 on the conductor 12. Interposed between the inner end 23 of the sleeve and the metallic collar 13 is a sealing means forming a hermetically sealed joint therebetween. Such sealing means includes a short tubular dielectric spacer or backing ring 27, preferably of quartz, surrounding but spaced from the rod 12, and having on its end adjacent the end of sleeve 18 a metalizing layer 28, such as molybdenum. The metalizing layer is deposited on the end surface of the tubular quartz collar in a conventional manner, as by vapor deposition. At its other end, the quartz collar is preferably provided with a layer 29 of a lubricant, such as aquadag, a colloidal dispersion of graphite in water. On the molybdenum layer 28 on the collar is a layer 31 of gold, deposited in a conventional manner, as by vapor deposition, for the purpose previously explained in connection with gold layer 17. As will be understood by those skilled in the art, the various aquadag and metal coatings are shown much thicker than actual in order to be visible in the seals of the drawings.

Enveloping the quartz backing ring 27 are a pair of mutually facing annular metallic sealing rings 33, each sealing ring having a radially inwardly extending flange 34 integral with a cylindrical portion 36, and having a radially outwardly extending flange 37 on the end thereof opposite flange 34. As shown in the drawings, the metallic sealing rings are slipped snugly over the ends of ring 27 so that flanges 37 abut intermediate the ends of the ring. In this position, the inwardly extending sealing ring flanges 34 lie snugly against opposite ends of the backing ring 27, one of the flanges resting slidably on the aquadag layer 29 and the other flange lying against the gold layer 31. The annular metallic sealing rings 33 are preferably fabricated from suitable thin, gold sheet stock so as to be sufficiently weak that they will deform or flex easily and not transmit any appreciable force.

The abutting flanges 37 of the sealing rings are hermetically united one to the other by the application of suitable heat and pressure to form a conventional pressure seal. This sealing unit of the total assembly preferably constitutes a subassembly fabricated as a separate entity and then assembled with associated elements as hereinafter described. While gold sheet stock has been specified as preferred for the rings 33, it will, of course, be obvious that any other suitably soft and ductile metallic sheet stock may be used.

The sealing ring and backing ring unit is inserted about the rod 12 in the position shown in FIGURES 1 and 2, from which it is apparent that the diameter of the inside diameter of the unit is about the same as the small diameter portion 19 of sleeve 18. When assembled as shown, one flange 34 of the sealing ring unit lies opposite gold plated surface 17 on the annular collar 13, and the other flange 34 lies opposite a layer of gold 40 deposited on a metalizing layer 41 of molybdenum on the end 23 of the cylindrical sleeve 18. With the parts in this position, that is, the position shown in FIGURE 2, but completely separate from sleeves 6 and 3, axial pressure applied between the quartz sleeve 18 and the collar 13, accompanied by the application of heat, will result in the upper flange 34 being hermetically bonded to the annular collar 13 and the lower flange 34 being hermetically bonded to the adjacent ends of sleeve 18 and backing ring 27. This operation may be carried out in conventional manner in a hydrogen atmosphere at elevated temperature until hermetic bonds are formed. Any tendency for the bonding pressure to bond the upper flange 34 to the upper end of quartz ring 27 is prevented by the aquadag coating 29.

Thus, it will be seen that a subassembly is formed consisting of rod 12, collar 13, backing ring 27, the composite sealing ring formed of the originally separate rings 33, and the quartz sleeve 18. After this subassembly is formed, it is inserted into sleeve 6 so that collar 13 abuts flange 7, and then the assembly of sleeves 18 and 6 is fully inserted into the tubular extension 3. With the parts so united and assembled, the ends 4, 8 and 22 of sleeves 3, 6 and 18, respectively, are hermetically united as by fusing together the adjacent ends of these members by application of appropriate heat. This is preferably accomplished by use of a hydrogen-oxygen torch. When this fusion has been completed, it will be found that the union between the quartz envelope wall portion 2 and the metallic lead-through conductor 12 is vacuum-tight, rigid, and not susceptible to rupture due to heating.

From the foregoing, it will be apparent that the seal is protected from the imposition of destructive stresses imposed by differences in expansion and contraction of the quartz and metal rod 12 by the unbonded slidable contact between the upper end of the backing ring 27 and the flange 34 of the associated sealing ring 33, which slidability is enhanced by the aquadag coating 29. Inasmuch as the associated flange 34 is hermetically bonded to the plate 13, this flange 34 will tend to move or expand in response to expansion and contraction of the metal rod 12 and plate 13. This expansion and contraction will be materially greater than the expansion of the quartz ring 27, and it is, therefore, important that a slidable union be provided between flange 34 and the quartz ring. Such a slidable union is not required at the other end of ring 27 inasmuch as the expansion and contraction characteristics of the quartz ring 27 are equal to the same characteristics of quartz sleeve 18 to which it is hermetically united. As a matter of fact, it is important that the lower end of the backing ring 27 be rigidly bonded to the sealing ring so that it will help overpower the sealing ring to prevent expansion or contraction of the ring relative to the quartz sleeve 18.

Another important aspect of the construction is the arrangement whereby the weak sealing ring structure 33 is in engagement with the backing ring 27 throughout the entire length of the sealing ring structure. Thus, the envelope 2 can safely contain gas under high pressure, as in the case of certain types of electron tubes. The high pressure gas in container 2 will pass between the metal collar 13 and the quartz flange 7 and into the annular chamber inside the sleeve 6, where it will simply force the sealing ring structure 33 against the backing ring 27. The important teaching, therefore, is that the weak sealing ring structure be arranged so that when one side is exposed to high gas pressure and the other side is exposed to relatively low gas pressure, the low pressure side is supported by a relatively strong portion of the device.

Although specific details of the present invention are shown and described herein, it is to be understood that modifications may be made therein without departing from the spirit and scope of the invention as set forth in the appended claims. For example, the preceding description teaches a seal structure broadly comprising a dielectric unit and a metal unit so arranged as to be clamped axially one between the other but radially slideable relative one to the other. In the specific embodiment shown in the drawings, the dielectric unit comprises the dielectric members 6 and 18, and the metal unit comprises the metal members 12 and 13.

What is claimed is:

1. A lead-through structure comprising a metal lead-through conductor, a first dielectric sleeve surrounding said conductor and spaced therefrom, a second dielectric sleeve coaxially disposed between said conductor and said first dielectric sleeve and having one end bonded to one end of the first sleeve, a metal collar on the lead-through conductor at a location spaced from the other end of said second dielectric sleeve, sealing means providing relative movement between the collar and said other end of the second dielectric sleeve interposed between and bonded to said other end of the second sleeve and the collar, and said first dielectric sleeve having an inwardly extending flange portion slidingly abutting the face of said collar opposite said sealing means.

2. A lead-through structure as in claim 1 wherein said sealing means comprises a dielectric backing ring having a metal cylinder overlying the periphery of the same, said backing ring being positioned around said lead-through conductor between said collar and said second sleeve, said cylinder having inwardly extending flange portions at each end thereof, the flange portion adjacent said collar being bonded thereto and slidable with respect to the adjacent end of the backing ring, and the other of said flange portions being bonded to the backing ring and to said other end of said second sleeve.

3. A hermetically sealed envelope having a cylindrical wall portion, a lead-through conductor within said cylindrical portion, a first dielectric sleeve disposed between said cylindrical envelope portion and said conductor and having one end hermetically sealed to the end of said envelope wall portion, a second dielectric sleeve coaxially disposed between said conductor and said first sleeve and having one end hermetically sealed to said hermetically sealed end of the first dielectric sleeve and the cylindrical wall portion of the envelope, a collar on the lead-through conductor at a location spaced from the other end of said second dielectric sleeve, sealing means providing relative movement between said collar and said other end of said second dielectric sleeve interposed between and bonded to said other end of the second sleeve and to said collar, and said first dielectric sleeve having an inwardly extending flange portion abutting said collar.

4. A lead-through structure as in claim 3 wherein said sealing means comprises a dielectric backing ring having a metal cylinder overlying the periphery of the same, said backing ring being positioned around said lead-through conductor between said collar and said second sleeve, said cylinder having inwardly extending flange portions at each end thereof, the flange portion adjacent said collar being bonded thereto and slidable with respect to the adjacent end of the backing ring, and the other of said flange portions being bonded to the backing ring and to said other end of said second sleeve.

5. A lead-through structure comprising a metal lead-through conductor, a dielectric sleeve spaced around said conductor, an annular shoulder on said conductor spaced axially from the end of said sleeve, a backing ring positioned between said end of the sleeve and said shoulder, a cylindrical sealing ring structure surrounding said backing ring, said cylinder having inwardly extending flange portions at each end, the flange portion adjacent said shoulder being bonded thereto, and the flange portion adjacent said end of the sleeve being bonded to said backing ring and to said end of the sleeve, the coefficient of expansion of said backing ring being substantially the same as that of said dielectric sleeve.

6. A lead-through structure as claimed in claim 5 in which said flange portion bonded to said shoulder is in sliding abutment with said backing ring.

7. A hermetic seal structure comprising a metal unit and a dielectric unit, one of said units having two axially spaced flat annular surfaces, the other of said units having an annular portion fitting between said flat surfaces and having one face slidably abutting one of said flat surfaces, a backing ring between the other face of said annular portion and the other of said flat surfaces on said one unit, a deformable metal sealing ring having one portion sandwiched between and bonded to said dielectric unit and said backing ring, said sealing ring having another portion spaced from said one portion and bonded to said metal unit, and said backing ring having a coefficient of expansion substantially equal to that of said dielectric unit.

8. A hermetic seal structure comprising a generally circular metal unit, a generally circular dielectric unit coaxial with said metal unit, means including annular surfaces on said units forming positive physical abutments preventing movement of said units relative to each other in both axial directions and permitting sliding radial movement of said units relative to each other, and a deformable sealing ring having one portion bonded to said metal unit and a spaced portion bonded to said dielectric unit.

9. A hermetic seal structure comprising a metal unit and a dielectric unit, one of said units having two axially spaced flat annular surfaces, the other of said units having an annular portion fitting between said flat surfaces and having one face slidably abutting one of said flat surfaces, a dielectric backing ring between the opposite face of said annular portion and the other of said flat surfaces on said one unit, a deformable metal sealing ring having one end sandwiched between and bonded to said backing ring and said dielectric unit, and the other end of said sealing ring being bonded to said metal unit.

10. A hermetic seal structure comprising a metal unit and a dielectric unit, a relatively weak sealing ring structure having spaced portions bonded to each of said units, said seal structure having a relatively strong portion compared to said relatively weak sealing ring structure, and said sealing ring structure being arranged so that one side thereof throughout the entire distance between said spaced portions is positioned closely adjacent said relatively strong portion.

11. A lead-through structure comprising a metal lead-through conductor, a first dielectric sleeve surrounding said conductor and spaced therefrom, a second dielectric sleeve coaxially disposed between said conductor and said first dielectric sleeve and having one end bonded to one end of the first sleeve, a collar on the lead-through conductor at a location spaced from the other end of said second dielectric sleeve, sealing means providing relative movement between the collar and said other end of the second dielectric sleeve interposed between and bonded to said other end of the second sleeve and the collar, said sealing means comprising a dielectric backing ring having a metal cylinder overlying the periphery of the same, said backing ring being positioned around said lead-through conductor between said collar and said second sleeve, said cylinder having inwardly extending flange portions at each end thereof, the flange portion adjacent said collar being bonded thereto and slidable with respect to the adjacent end of the backing ring, and the other of said flange portions being bonded to the backing ring and to said other end of said second sleeve.

12. A hermetically sealed envelope having a cylindrical wall portion, a lead-through conductor within said cylindrical portion, a first dielectric sleeve disposed between said cylindrical envelope portion and said conductor and having one end hermetically sealed to the end of said envelope wall portion, a second dielectric sleeve coaxially disposed between said conductor and said first sleeve and having one end hermetically sealed to said hermetically sealed end of the first dielectric sleeve and the cylindrical wall portion of the envelope, a collar on the lead-through conductor at a location spaced from the other end of said second dielectric sleeve, sealing means providing relative movement between said collar and said other end of said dielectric sleeve interposed between and bonded to said other end of the second sleeve and to said collar, said sealing means comprises a dielectric backing ring having a metal cylinder overlying the periphery of the same, said backing ring being positioned around said lead-through conductor between said collar and said second sleeve, said cylinder having inwardly extending flange portions at each end thereof, the flange portion adjacent said collar being bonded thereto and slidable with respect to the adjacent end of the backing ring, and the other of said flange portions being bonded to the backing ring and to said other end of said second sleeve.

References Cited by the Examiner

UNITED STATES PATENTS

| | | | |
|---|---|---|---|
| 1,761,175 | 6/1930 | Bol et al. | 174—50.63 X |
| 1,868,410 | 7/1932 | Dallenbach | 174—152 |
| 2,190,302 | 2/1940 | Waldschmidt | 174—50.63 |
| 3,179,213 | 4/1965 | Kuehne et al. | 189—36.5 |

LARAMIE E. ASKIN, *Primary Examiner*.